United States Patent [19]
Cox

[11] Patent Number: 5,875,233
[45] Date of Patent: *Feb. 23, 1999

[54] AUDIO RECORD AND PLAYBACK THROUGH A STANDARD TELEPHONE IN A COMPUTER SYSTEM

[75] Inventor: Daniel R. Cox, Hillsboro, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 802,844

[22] Filed: Feb. 18, 1997

Related U.S. Application Data

[63] Continuation of Ser. No. 522,511, Sep. 1, 1995, abandoned, which is a continuation of Ser. No. 119,716, Sep. 10, 1993, abandoned.

[51] Int. Cl.[6] .................................................. H04M 1/64
[52] U.S. Cl. .................................. 379/88.07; 379/90.01; 379/110.01; 379/442
[58] Field of Search ................................ 379/67, 88, 89, 379/90.01, 110.01, 442, 88.27, 88.28, 67.1, 88.07

[56] References Cited

U.S. PATENT DOCUMENTS

| | | | |
|---|---|---|---|
| 4,663,777 | 5/1987 | Szeto ........................................ | 379/88 |
| 4,799,144 | 1/1989 | Parruck et al. ........................... | 379/284 |
| 4,916,726 | 4/1990 | Morley, Jr. et al. ..................... | 379/218 |
| 5,065,425 | 11/1991 | Le comte et al. ........................ | 379/93 |
| 5,283,819 | 2/1994 | Glick et al. ............................... | 379/93 |
| 5,343,516 | 8/1994 | Callele et al. ............................ | 379/442 |

FOREIGN PATENT DOCUMENTS

WO 9302412  2/1993  WIPO .

OTHER PUBLICATIONS

"Digital Signal Processing Applications", Texas Instruments, 1986, pp. 380–382.

Bicom 4LS Digital Voice Processing System; Bicom Computer and Communications Systems, Apr. 1991.

*Primary Examiner*—Fan S. Tsang
*Attorney, Agent, or Firm*—Blakely, Sokoloff., Taylor & Zafman LLP

[57] ABSTRACT

A method for performing audio input/output through a telephone in a computer system, wherein a telephony driver and an audio driver and an audio task executing on a digital signal processing subsystem of the computer system perform sound sample data conversion to a standard data format and perform sample rate conversion and stereo to mono conversion for digital telephone compatibility.

27 Claims, 7 Drawing Sheets

AUDIO RECORD AND PLAYBACK THROUGH A STANDARD TELEPHONE IN A COMPUTER SYSTEM

This is a continuation of application Ser. No. 08/522,511 file Sep. 1, 1995, now abandoned, which is a continuation of application Ser. No. 08/119,716 filed Sep. 10, 1993, now abandoned.

BACKGROUND OF THE INVENTION

1. Field of the Invention

The present invention pertains to the field of personal computer systems. More particularly, this invention relates to a multifunction input/output subsystem for a personal computer that enables unrestricted sound file input and output through a telephone set.

2. Art Background

Non dedicated telephone lines are often employed in small office or home office environments to provide modem and fax communication lines for a personal computer. The personal computer typically employs a non dedicated telephone line for sharing modem and fax calls as well as voice calls. Such telephone line sharing enables modem and fax communication while avoiding the cost of providing separate modem telephone lines and fax telephone lines in the small business or home office.

In such small business or home office environments, a telephony subsystem of the personal computer typically performs the telephone line interface functions required for modem, fax and voice communication. The telephone line interface functions include line seizure and ring detect, as well as audio and digital signal processing functions.

Typically, application programs executing on the personal computer perform the higher level modem, fax and voice communication functions as well as user interface functions.

In a typical small business or home office telephone line topology, the telephony subsystem is coupled to an incoming telephone line or a private branch exchange (PBX) line. The telephony subsystem usually drives one or more serial telephones over a local line.

Typically in such systems, the telephony subsystem transfers incoming voice calls on the telephone line to the serial telephone over the local line to enable a user to receive the voice call. The telephony subsystem usually employs a switching device such as a relay to couple the telephone line to the local line and serial telephone.

Unfortunately is such prior systems, the telephony subsystem creates a physical connection through the relay between the telephone line and the local line to transfer incoming voice calls to the serial telephone. With such a physical connection, the originator of the incoming voice call hears a busy signal over the telephone line if the serial telephone is off-hook during the incoming call. As a consequence, the serial telephone must remain on-hook to receive incoming voice calls, thereby precluding the use of the serial telephone for other input/output functions.

SUMMARY AND OBJECTS OF THE INVENTION

One object of the present invention is to employ a standard telephone for audio input and output functions in a computer system.

Another object of the present invention is to employ the telephone for audio input and output functions in the computer system over a local line while enabling reception of incoming calls over a telephone line.

A further object of the present invention is to provide a software architecture for a multifunction I/O subsystem that decouples processing of incoming calls over the telephone line from the processing of telephony signals to and from the telephone.

A further object of the present invention is to enable audio input and output functions through a standard analog or digital telephone by providing a standard data format for data streams transferred between driver programs in the multifunction I/O subsystem, such that the standard data format enables telephony driver programs and audio driver programs to produce and consume sound data streams for audio tasks.

Another object of the present invention is to employ a digital telephone for audio input and output functions in the computer system by utilizing stereo-to-mono conversion and sample-rate conversion functions which operate on the standard data format.

Another object of the present invention is to enable recording of sound files for the computer system through the standard telephone, and to enable playback of sound files through the standard telephone.

These and other objects of the invention are provided by a method for performing audio record and playback functions through a telephone in a computer system. A user selects a normal audio mode or a telephone audio mode for the computer system through a user interface of a host audio application program executing on a host processor of the computer system. A standard data format for sound data streams enables a telephony driver and an audio driver executing on a digital signal processing subsystem of the computer system to generate and consume sound samples. The telephony driver samples and transmits audio signals on a local line coupled to the telephone. The telephony driver converts the sound samples to and from a data stream having a standard data format.

During audio recording, a telephony driver program generates a set of sound samples by sampling audio signals over a local line coupled to a telephone, and converts the sound samples into a sound data stream having a standard data format if the telephone audio mode is selected.

An audio driver generates the sound samples by sampling audio signals over an audio line, and converting the sound samples into the sound data stream having the standard data format if the normal audio mode is selected.

The sound data stream is then transferred to an audio task executing on a digital signal processing subsystem in the computer system. The audio task converts the sound data stream into a format required by a host audio application program executing on a host processor in the computer system, and then transfers the sound data stream to the host audio application program.

During audio playback, the audio task receives a sound data stream from the host audio application program and converts the sound data stream from a data format required by the host audio application program into the standard data format. The audio task then transfers the sound data stream having the standard data format to the audio driver if the normal audio mode is selected. The audio driver converts the sound data stream into a set of sound data values and transfers the sound data values to a stereo audio codec circuit for sound generation over an audio signal line.

The audio task transfers the sound data stream to the telephony driver if the telephone audio mode is selected. The telephony driver converts the sound data stream into a set of telephony data values and transfers the telephony data values to a telephony circuit, such that the telephony circuit generates telephony audio signals corresponding to the telephony data values and transfers the telephony audio signals to a telephone over a local line.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
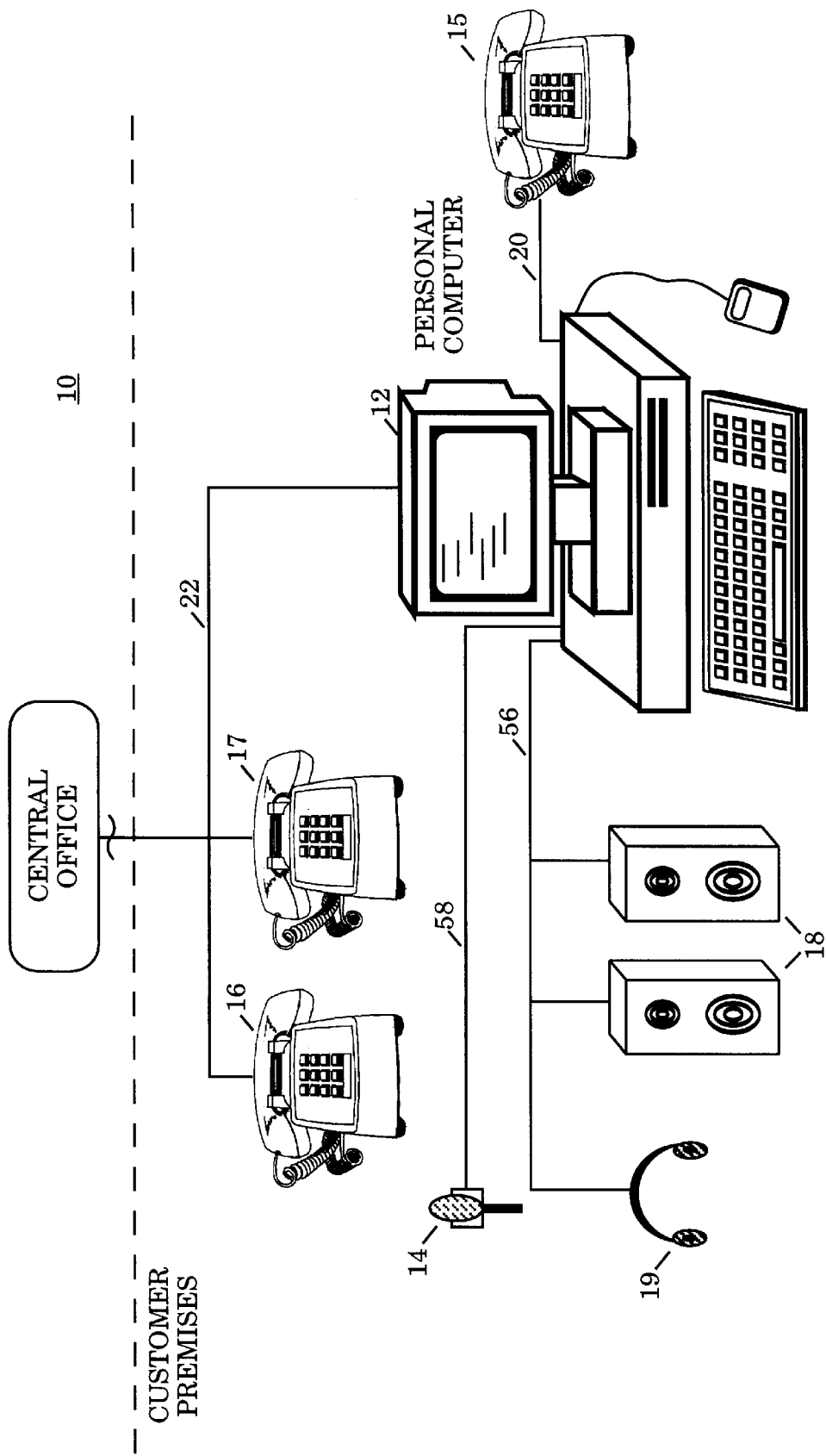
FIG. 1 illustrates a telephone system for one embodiment which includes a personal computer that receives incoming calls and transmits outgoing calls over a telephone line.

FIG. 1 illustrates a computer system 10 for one embodiment. The computer system 10 includes a personal computer 12 that receives incoming calls and transmits outgoing calls over a telephone line 22. The telephone line 22 comprises a standard telephone line or alternatively a private branch exchange (PBX) line or ISDN connection.

A pair of telephones 16 and 17 are coupled to the telephone line 22 in parallel with the personal computer 12. A serial telephone 15 is coupled to the personal computer 12 over a local line 20.

Figure 2:
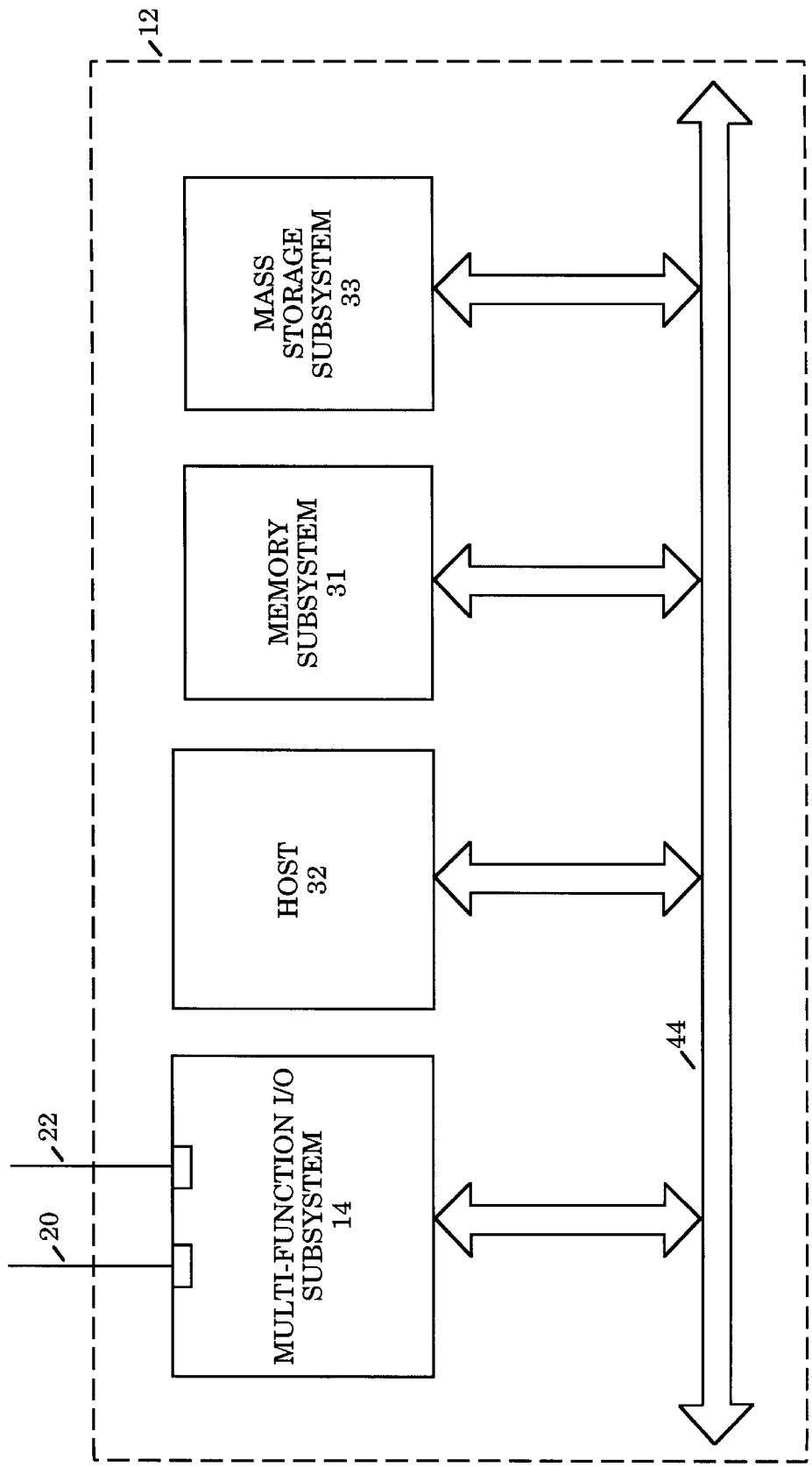
FIG. 2 illustrates the personal computer which comprises a host processor, a memory subsystem, a mass storage subsystem, and a multifunction I/O subsystem.

FIG. 2 illustrates the personal computer 12. The personal computer 12 comprises a host processor 32, a memory subsystem 31, a mass storage subsystem 33, and a multifunction I/O subsystem 14. The host processor 32, the memory subsystem 31, and the multifunction I/O subsystem 14 communicate over a host bus 44.

The multifunction I/O subsystem 14 provides sound capture/playback functions, fax and data modem functions, and telephone control functions. The multifunction I/O subsystem 14 provides connections for microphones and speakers, and hardware to support telephone and telephone line connections.

The mass storage subsystem 33 represents a wide variety of mass storage devices for large scale data and program storage, including magnetic disk drives and CD ROM drives.

Figure 3:
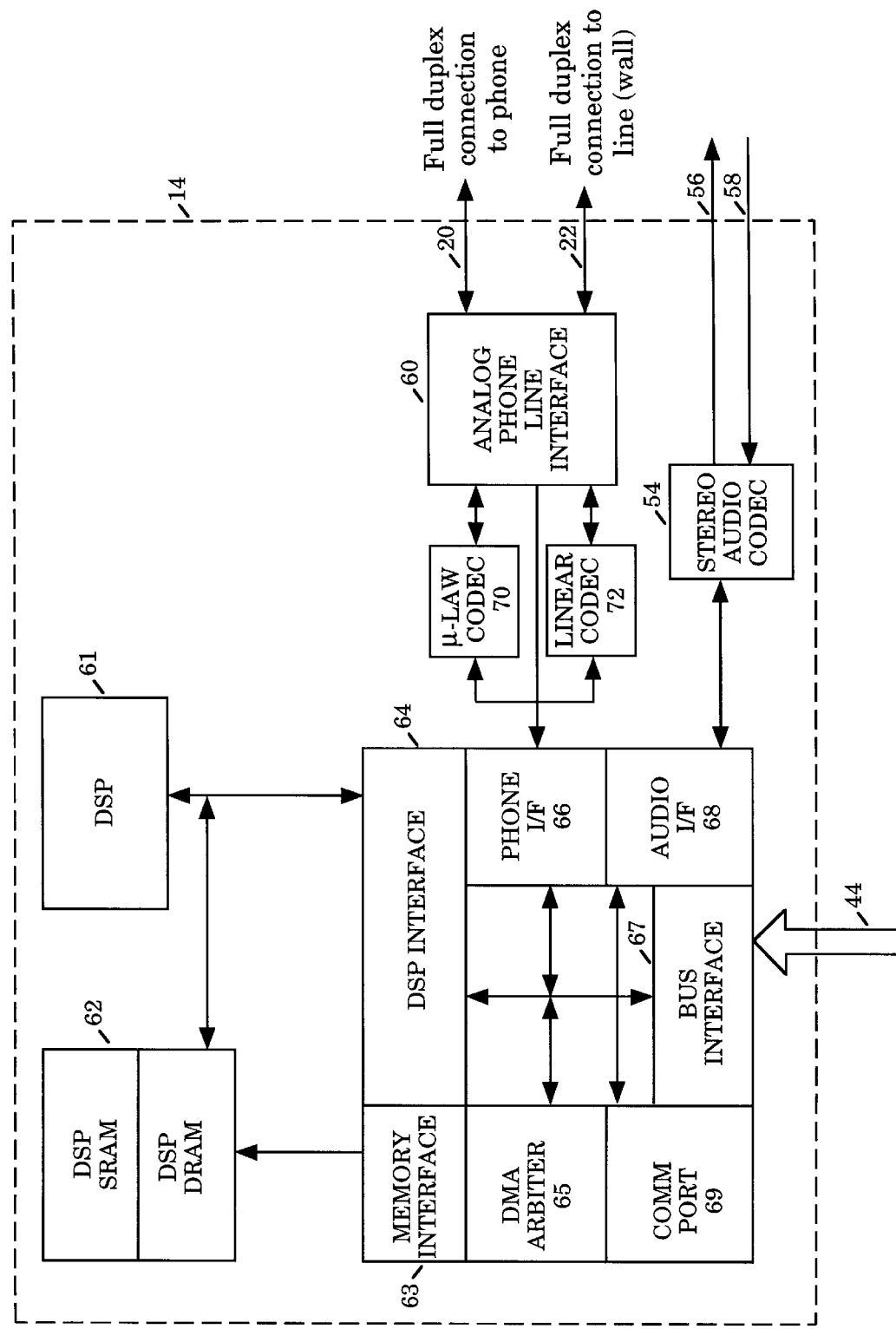
FIG. 3 is a diagram illustrating the multifunction I/O subsystem which comprises an analog phone line interface circuit and associated codec circuits, a digital signal processor, an stereo audio codec circuit, and a set of interface circuits.

FIG. 3 is a diagram illustrating the multifunction I/O subsystem 14. The multifunction I/O subsystem 14 comprises an analog phone line interface circuit 60 and associated codec circuits (a $\mu$-law codec 70 and a linear codec 72), a digital signal processor (DSP) 61, an stereo audio codec circuit 54, and a set of interface circuits 63–69.

A memory block 62 comprises a DSP static random access memory (SRAM) and a DSP dynamic random access memory (DRAM). Both DRAM and SRAM can be used for program or data.

The bus interface circuit 67 and the DMA arbiter circuit 65 enable the DSP 61 to communicate over the host bus 44.

The analog phone line interface circuit 60 and the $\mu$-law and linear codec circuits 70 and 72 enable transfer of incoming and outgoing calls over the local line 20 and the telephone line 22 including full duplex connections between the $\mu$-law codec 70 and the telephone 15 and full duplex connections between linear codec 72 and the telephone line 22. The $\mu$-law phone and linear line codec circuits 70 and 72 transfer digital data to and from the DSP 61 through the phone interface circuit 66.

The stereo audio codec circuit 54 transfers audio signals (mono and stereo) to the external speakers 18 and the headphone set 19 over a set of audio signal lines 56. The stereo audio codec circuit 54 also receives audio signals (mono and stereo) from an audio source and external microphone 14 over a set of audio signal lines 58. The stereo audio codec circuit 54 performs analog-to-digital conversion on the received audio signals, and transfers the digitized audio data to the audio interface (I/F) circuit 68. The stereo audio codec circuit 54 performs digital-to-analog conversion on audio data received through the audio interface (I/F) circuit 68.

For one embodiment, the multifunction I/O subsystem 14 comprises an industry standard architecture (ISA) add-in card that provides hardware to support audio and telephony applications.

Figure 4:
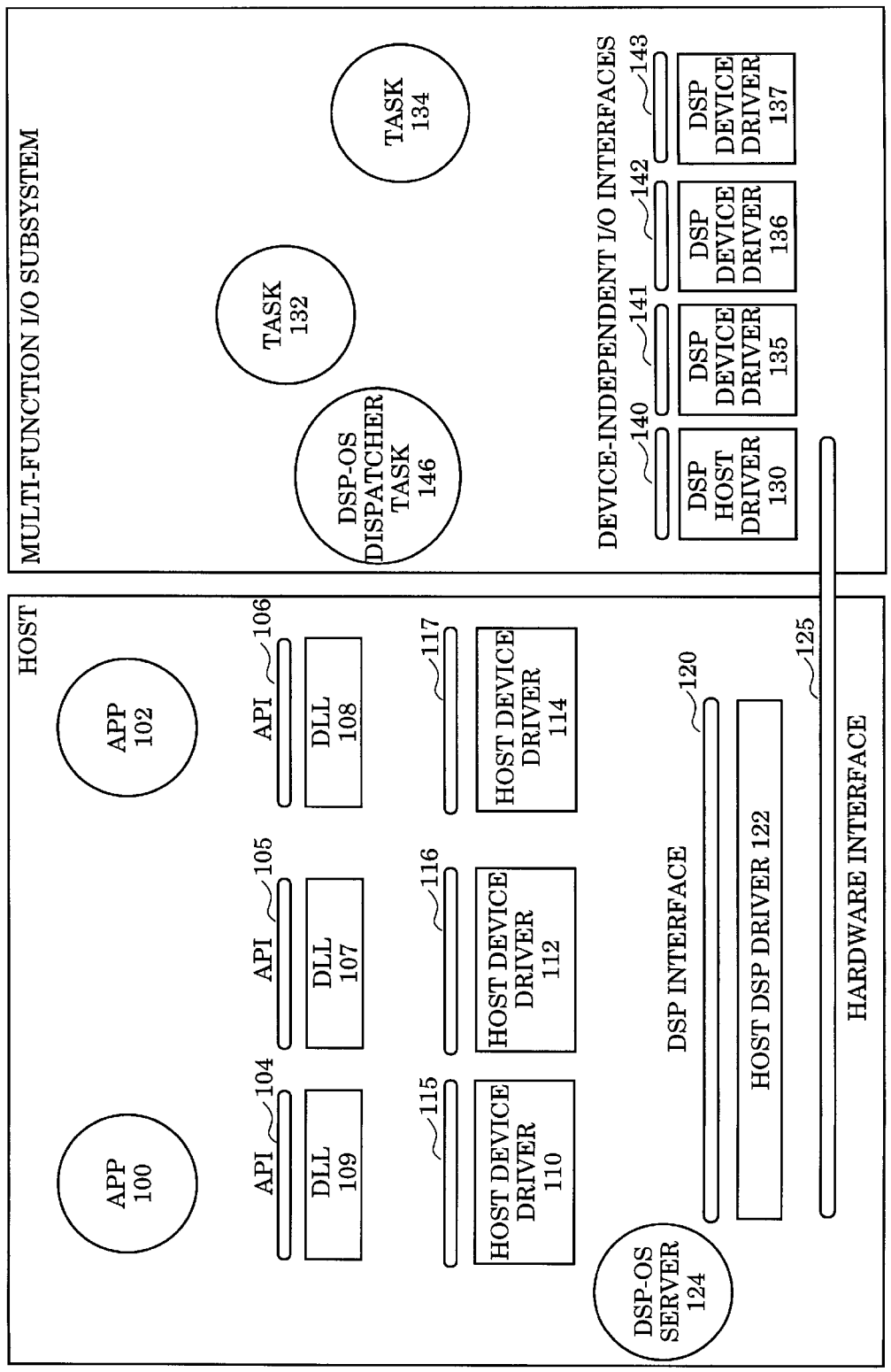
FIG. 4 illustrates the software architecture for the host processor and the multifunction I/O subsystem.

FIG. 4 illustrates the software elements for the host processor 32 and the multifunction I/O subsystem 14. A set of application programs 100–102 executing on the host processor 32 access the hardware functions of the multifunction I/O subsystem 14 through an appropriate program interface (API) 104–106.

An application program interface consists of a dynamic link library (DLL) layer and a corresponding host device driver. The dynamic link library layer interacts with host application programs that use the corresponding application program interface. The dynamic link library layer performs error checking and translates application program calls into messages that are passed to the appropriate device driver.

For example, the application program interface 104 provides dynamic link library 109 that links at runtime to a host device driver that communicates with a hardware device in the multifunction I/O subsystem 14. The dynamic link library 109 translates the application program interface 104 calls into messages that are passed to the device driver which performs the requested function.

The dynamic link library layers 107–109 of the application program interfaces 104–106 interact with one or more host device drivers 110–114 via common device driver interfaces 115–117. The host device drivers 110–114 are implemented as dynamic link libraries. A set of device-type specific custom messages are defined by the device driver for the corresponding device class.

The code for the application program interfaces 104–106 comprises the dynamic link libraries 107–109. The application programs 100–102 that require the services provided by the application program interfaces 104–106 link against the library corresponding to the corresponding dynamic link library 107–109.

The dynamic link libraries 107–109 translate application program interface calls into host device driver calls or messages. The host device driver calls or messages and associated data structures define the device driver interface (DDI) for the corresponding device class. A host device driver for an application program interface is provided by implementing the corresponding DDI.

The multifunction I/O subsystem 14 implements a digital signal processing operating system (DSP-OS) that executes on the DSP 61. The DSP-OS enables multiple concurrent execution of audio and telephony tasks (such as a DSP-OS task 132 and a DSP-OS task 134) on the multifunction I/O subsystem 14.

The DSP-OS is a real time multitasking operating system that provides two programming interfaces: the application programming interface and a system programming interface (SPI). The DSP-OS application program interface provides a set of high-level processor independent functions for computations by the DSP 61, as well as stream input and output to the multifunction I/O subsystem 14.

The software for the multifunction I/O subsystem 14 includes a set of DSP device drivers 130 and 135–137. The DSP-OS tasks 132–134 perform computations and I/O to devices via the DSP device drivers 135–137.

A typical DSP-OS task reads input data from a hardware device, processes the input data, and then writes output data to another hardware device. Normally, multiple DSP-OS tasks perform such processes concurrently. A DSP device driver enables the DSP-OS tasks to access hardware devices. Each hardware device corresponds to a DSP device driver that manages the hardware device and provides I/O services to the DSP-OS tasks.

The DSP-OS system programming interface provides a set of functions for managing DSP-OS tasks, and for managing the DSP memory 62. The DSP-OS system programming interface provides functions for synchronizing DSP-OS tasks, and functions for performing device-independent I/O.

The host device drivers 110–114 communicate with DSP programs executing on the multifunction I/O subsystem 14 through a DSP interface 120. For example, a host audio device driver uses the DSP interface 120 to control a DSP-OS task that manages data transfer to and from the stereo audio codec circuit 54. The host audio device driver can communicate with several DSP-OS tasks. A DSP-OS task created by a host device driver may create other DSP-OS tasks to provide the appropriate hardware functions.

The DSP interface 120 is message-based. The DSP interface 120 defines a common structure for messages and a programming model for communication between host device drivers and corresponding DSP-OS tasks. Each host device driver defines an appropriate set of message formats (such as command codes, parameters, status and reply codes, etc.) for communication with the corresponding DSP-OS task.

A host DSP driver 122 implements the DSP interface 120. The host DSP driver 122 comprises a dynamic link library (DLL) that enables communication with the multifunction I/O subsystem 14. The host DSP driver 122 loads the DSP-OS and starts the DSP 61 to initialize the multifunction I/O subsystem 14 and run the DSP-OS. After the multifunction I/O subsystem 14 is initialized and the DSP-OS is running, the host DSP driver 122 moves buffers of data and messages between the host processor 32 and the multifunction I/O subsystem 14.

The host DSP driver 122 communicates with a DSP host driver 130 executing under the DSP-OS. The host DSP driver 122 and the DSP host driver 130 do not examine the content of the data and messages passed over the hardware interface 125. The host DSP driver 122 and the DSP host driver 130 synchronize multiple data and message streams and route each stream to the appropriate host device driver and DSP-OS task.

A DSP-OS server 124 server executing on the host processor 32 functions as a server for the DSP-OS tasks 132–134 and 146. The DSP-OS server 124 processes requests from the multifunction I/O subsystem 14. The DSP-OS server 124 is a "daemon" on the host processor 32. The DSP-OS server 124 is a part of the host DSP driver 122. The DSP-OS server 124 server services file and console I/O requests from the DSP-OS tasks 132–134 and 146 to the host processor 32. The DSP-OS server 124 assists in dynamic DSP-OS task loading, and provides a user interface for status and performance monitoring of the multifunction I/O subsystem 14.

The DSP-OS is a real-time multitasking operating system that provides a kernel and input/output (I/O) environment for the software executing on the multifunction I/O subsystem 14. The DSP-OS defines a set of device-independent I/O interface 140–143 for use by the DSP-OS tasks 132–134 and 146 to access hardware devices of the multifunction I/O subsystem 14. The DSP-OS also defines stackable device drivers which are blocks of code that provide common (i.e., reusable) transformations on I/O streams in the standard format.

A DSP program executing on the DSP 61 functions as a server for a corresponding client host device driver on the host processor 32. A DSP program performs the commands requested by the client host device driver through the appropriate messages.

A DSP program consists of one or more DSP-OS tasks that move data from source devices to sink devices, while performing specific processing and transformations on the data. For example, an audio DSP-OS task reads audio samples from the stereo audio codec circuit 54 using a device independent I/O interface, processes the samples to perform data compression, and then transfers the compressed data to the host audio device driver executing on the host processor 32.

The DSP-OS creates a DSP-OS dispatcher task 146 after starting up. The DSP-OS dispatcher task 146 processes requests from the host device drivers 110–114 to create and delete DSP-OS tasks. The DSP-OS dispatcher task 146 matches a task name to the appropriate DSP-OS tasks and then loads and starts the new DSP-OS tasks. The DSP-OS dispatcher task 146 also creates mailboxes for communications between the requesting host device driver or other DSP-OS tasks and the new DSP-OS task.

The functions of a DSP-OS task are controlled by placing messages in a corresponding mailbox. The interpretation of the messages follows a device-class specific protocol. Each DSP-OS task recognizes a small set of basic messages.

Figure 5:
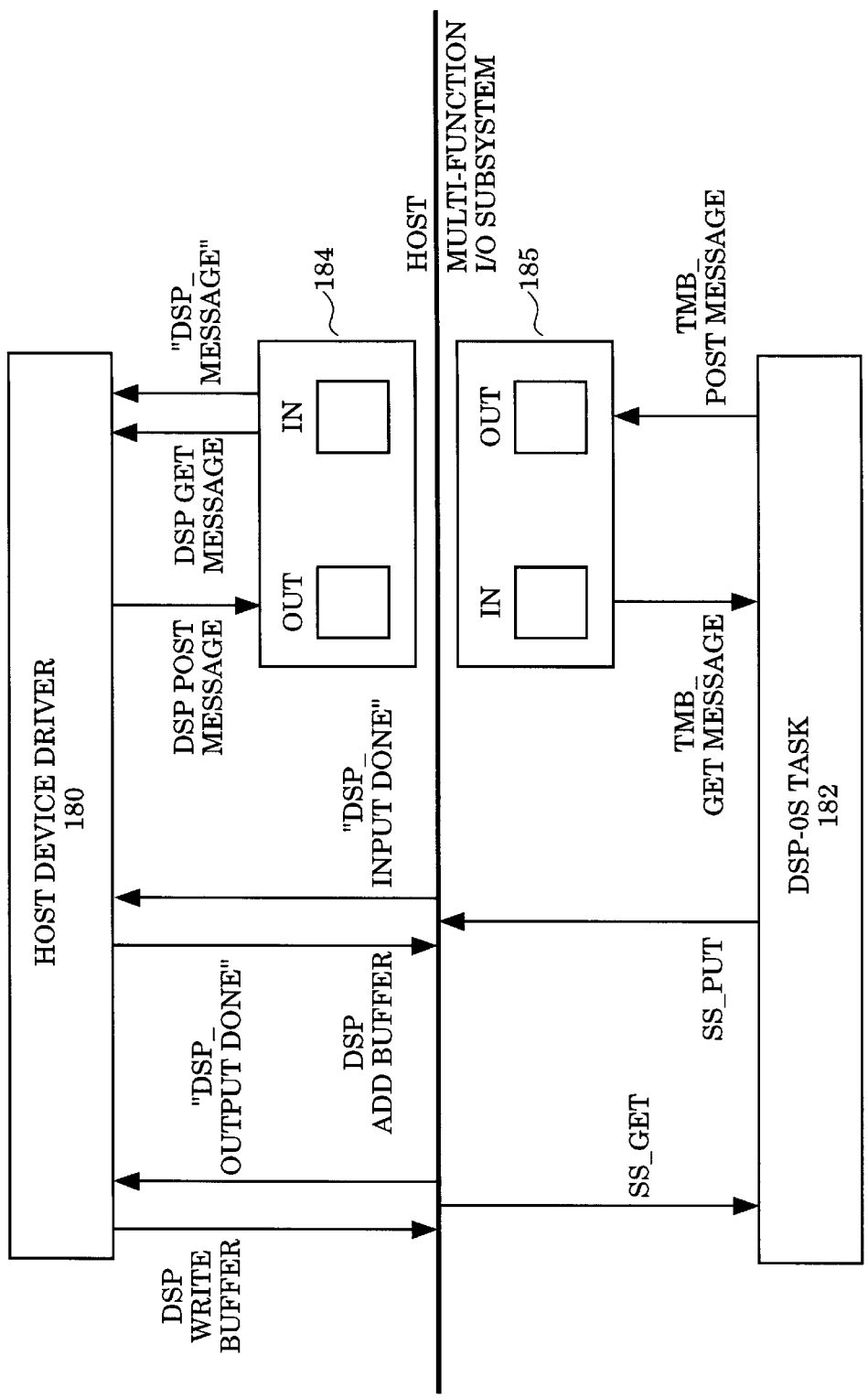
FIG. 5 illustrates interaction between a host device driver executing on the host processor and a corresponding DSP-OS task executing on the multifunction I/O subsystem.

FIG. 5 illustrates interaction between a host device driver 180 executing on the host processor 32 and a corresponding DSP-OS task 182. The host device driver 180 controls and communicates with the DSP-OS task 182 via a control channel and one or more data channels.

The DSP interface 120 provides the control channel that enables the host device driver 180 to send messages to the DSP-OS task 182, and receive messages from the DSP-OS task 182. The control channel is implemented according to a mailbox facility. The host device driver 180 calls a dspOpenTask routine to create the DSP-OS task 182, and to create a pair of mailboxes 184–185. The host device driver 180 and the DSP-OS task 182 use the mailboxes 184–185 to exchange messages.

Large data transfers between the host device driver 180 and the DSP-OS task 182 are subdivided into blocks according to a buffer size specified for the host device driver 180. The control channel messages are interleaved with data blocks.

The host device driver 180 and the DSP-OS task 182 exchange data through one or more data streams. A data stream is a channel that provides data flow in one direction between a host device driver and a DSP-OS task. Two data channels are employed to exchange data in both directions, i.e. from the host device driver 180 to the DSP-OS task 182 and from the DSP-OS task 182 to the host device driver 180.

The DSP interface 120 supplies a uniform set of services for communication with the multifunction I/O subsystem 14. For one embodiment, the DSP interface 120 supplies the communication services for the multifunction I/O subsystem 14 in a Microsoft® Windows environment. The services are employed by the application programs 100–102 and the host device drivers 110–114.

Each host device driver 110–114 starts and stops at least one DSP-OS task, and transfers data streams to and from the DSP-OS task. The DSP interface 120 is optimized for efficient data streaming to the DSP-OS task. The DSP interface 120 enables command message transfer between the host device drivers 110–114 and the DSP-OS tasks.

The DSP interface 120 also provides basic control functions for the multifunction I/O subsystem 14. The control functions are employed by the DSP-OS server 124. The control functions provided by the DSP interface 120 include control functions for loading the DSP-OS program image, control functions for starting and stopping the DSP 61, as well as control functions for obtaining diagnostic and status information from the multifunction I/O subsystem 14.

An application executing on the DSP 61 consists of one or more DSP-OS tasks that typically performs computations. A DSP-OS task has an associated host device driver that functions as a server. The host device driver launches the DSP-OS tasks (via a call to dspOpenTask) and thereafter sends commands to the newly launched DSP-OS tasks. The DSP-OS tasks service requests from the corresponding host device driver. A host device driver and a corresponding DSP-OS task have a client/server relationship.

The DSP-OS tasks are created through the DSP-OS dispatcher task 146. The DSP-OS dispatcher task 146 is a special DSP-OS task created when the system starts up. The DSP-OS dispatcher task 146 communicates with the host DSP driver 122. The DSP-OS dispatcher task 146 sets up the DSP-OS environment on the multifunction I/O subsystem 14 and then assumes the role of a central control DSP-OS task. The DSP-OS dispatcher task 146 responds to a set of command messages from the host device drivers, including requests to create and delete a DSP-OS task.

The DSP-OS tasks send data to the host device drivers, and receive data from the host device drivers. A data streaming interface enables efficient transmission of data blocks (buffers). The data streaming interface is accessed through the DSP-OS. The host application programs access the data channels between a DSP-OS task and the corresponding host device driver through the host device driver.

The DSP-OS tasks access files on the mass storage subsystem 33 through a corresponding host device driver.

The DSP-OS supports device independent I/O by providing a common set of functions used to access the differing hardware devices of the multifunction I/O subsystem 14 in a uniform manner. The DSP device drivers 130 and 135–137 implement the DSP-OS device-independent I/O interfaces 140–143 to enable access of the hardware devices of the multifunction I/O subsystem 14. The DSP-OS tasks 132–134 and 146 employ the device-independent I/O interfaces 140–143 to transfer data to or from any hardware device of the multifunction I/O subsystem 14 as a source or a sink.

The DSP-OS tasks 132–134 and 146 read input data from a source device, processes the input data, and then write the processed data to a sink device. An SS_get and an SS_put operation are used for such processing. The local line 20, the telephone fine 22, the stereo audio codec circuit 54, and the hardware devices of the host processor 32 are available as sources and sinks. The mass storage subsystem 33 functions as multiple sinks and multiple sources simultaneously, such that multiple logical data channels are concurrently active.

The multifunction I/O subsystem 14 provides hardware devices that support multiple application program interfaces. For example, the stereo audio codec circuit 54 is employed for sound file input and output through an audio application program interface, and for telephone conversations through a telephony application program interface. The telephone line 22 is employed for telephone conversations through the telephony application program interface, for sending and receiving faxes through a fax application program interface, and for data modem processing. In all such cases, the particular hardware device is accessed via the DSP-OS device-independent I/O interface.

The hardware devices of the multifunction I/O subsystem 14 that generate and consume sampled sound data streams represent the sampled sound data in differing data formats. A hardware device or DSP device driver may represent sound data in amplitude normalized format, wherein the sound samples comprise 32-bit floating point left justified data values that are scaled to range from $-2^{}31$ to $2^{}31-1$ for conversion to 32-bit signed integers.

A hardware device or DSP device driver may represent sound data as 32-bit floating point right justified data values, wherein 8-bit sound samples range from −256 to 255 and 16-bit sound samples range from −32768 to 32767. A hardware device or device driver may represent sound data as 16-bit signed integer right justified data values with one sample per 32-bit word, wherein sound samples range from −32768 to 32767.

A hardware device or DSP device driver may represent sound data as packed 16-bit integer data values, wherein a 32-bit word either represents left and right samples (stereo) or two successive samples (mono). In addition, 8-bit μ-law samples are packed four to a 32-bit word.

DSP-OS tasks employ a standard data format to represent sampled sound data streams for the multifunction I/O subsystem 14. The standard data format is 32-bit floating-point left-justified. The sound data stream samples are scaled to range between $-2^{}31$ an $2^{}31-1$. Such scaling enables conversion between floating point and integer data formats.

The standard data format supports a range of $+/-(2)^{127}$. However, sound sample values having a magnitude greater than $2^{31}$ generate erroneous results if sent to a hardware device of the multifunction I/O subsystem 14. Also, sound sample values having a magnitude less than $2^{15}$ are equivalent to 0.

For example, the DSP device driver for the stereo audio codec 54 receives standard data format samples from a corresponding DSP-OS task, converts the standard data format samples into 32-bit integers, then right-shifts the 32-bit integers by 16 bits to extract the high-order 16 bits, and then writes the high-order 16 bits to the stereo audio codec 54.

For another example, a DSP device driver for telephony converts standard data format sound samples into to 8-bit $\mu$-law samples by converting the standard data format sound samples into 32-bit integers, then extracting the high-order 14 bits and converting the high-order 14 bits to 8-bit $\mu$ law.

The standard data format for sampled sound data streams enables the DSP-OS tasks to open and read sound samples from multiple hardware devices that require differing data formats. Similarly, the standard data format for sampled sound data streams enables the DSP-OS tasks to write sound samples to multiple hardware devices that require differing data formats.

The standard data format for sampled sound data streams also enables the DSP-OS tasks to communicate with devices that generate the same data format with differing scaling. For example, the stereo audio codec 54 generates true 16-bit integer samples that range from −32768 to 32767, while the DSP device driver for the telephone line 22 converts 8-bit $\mu$ law sound samples into a linear integer format having a 14-bit range (−4096 to 4095). The standard data format for sampled sound data streams enables compatibility if the sound samples for the telephone line 22 are left justified and the extra least significant bits set to zero.

Figure 6:
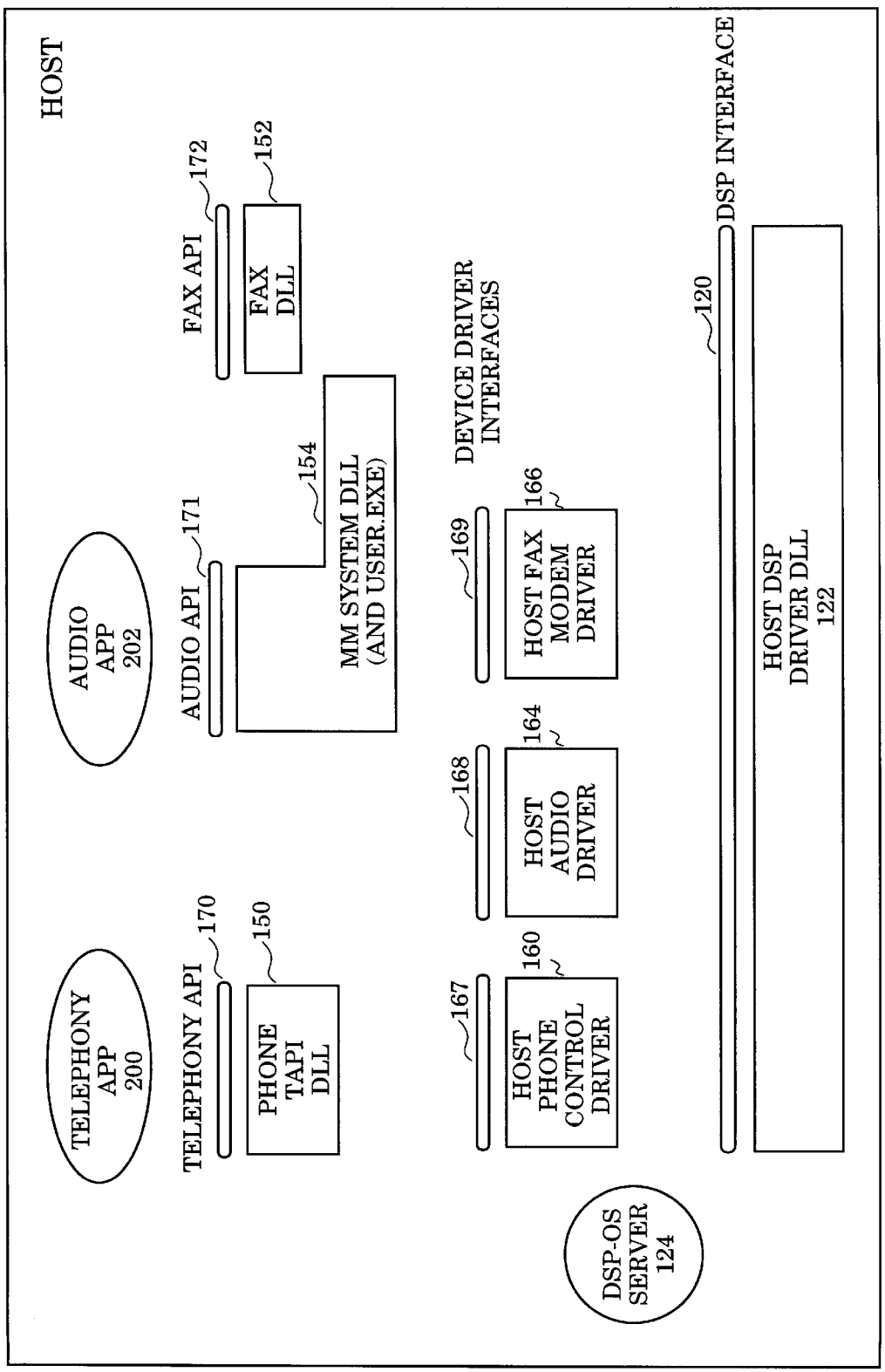
FIG. 6 illustrates the software architecture of the host processor for one embodiment.

FIG. 6 illustrates the software architecture of the host processor 32 for one embodiment. The host application programs on the host processor 32 comprise a host telephony application program 200 and a host audio application program 202.

The host telephony application program 200 enables origination and reception of voice calls, data modem calls, and fax calls over the telephone line 22. The host telephony application program 200 performs high-lever user interface functions and telephony handshake functions for handling the voice, data modem, and fax transfers over the telephone line 22.

The host telephony application program 200 communicates with a host phone control driver 160 and a host fax-modem driver 166 through a telephony application program interface 170. The host phone control driver 160 and the host fax-modem driver 166 communicate with corresponding DSP-OS tasks on the multifunction I/O subsystem 14 through the DSP interface 120 of the host DSP driver 122.

The telephony application program interface 170 provides telephony control services to the telephony application program 200. The telephony application program interface 170 provide services for handling inbound calls, for initiating outbound calls, for accessing features provided by the analog phone line interface circuit 70, and for communicating with remote equipment.

A fax application program interface 172 provides a set of fax control operations to the telephony application program 200. The fax application program interface 172 provides operations for managing incoming and outgoing faxes.

The host audio application program 202 enables recording and playback of sound files. The audio application program 202 enables transfer of information between sound files on the mass storage subsystem 33 and audio playback devices (not shown) coupled to the audio signal lines 56. The audio application program 202 also enables transfer of information between sound files on the mass storage subsystem 33 and the serial telephone 15 coupled to the local line 20.

The host audio application program 202 communicates with a host audio driver 164 through an audio application program interface 171. The host audio driver 164 communicates with corresponding DSP-OS tasks on the multifunction I/O subsystem 14 through the DSP interface 120 of the host DSP driver 122.

The functions provided by the audio application program interface 171 include querying audio devices, opening and closing audio devices, recording and playing audio data, and controlling playback and recording.

The host audio application program 202 also communicates with the host phone control driver 160 through the telephony application program interface 170 if the serial telephone 15 is employed as a sound file input/output device.

The host audio application program 202 implements a user interface function that enables a user of the personal computer 12 to select the serial telephone 15 as the sound file input/output device.

For one embodiment, the audio application program interface 171 comprises a Waveform application program interface provided by Microsoft® Corporation for processing Waveform sound files. The Waveform application program interface is part of Microsoft® Windows. The Waveform application program interface provides sound record and playback functions to Microsoft® Windows host applications.

Figure 7:
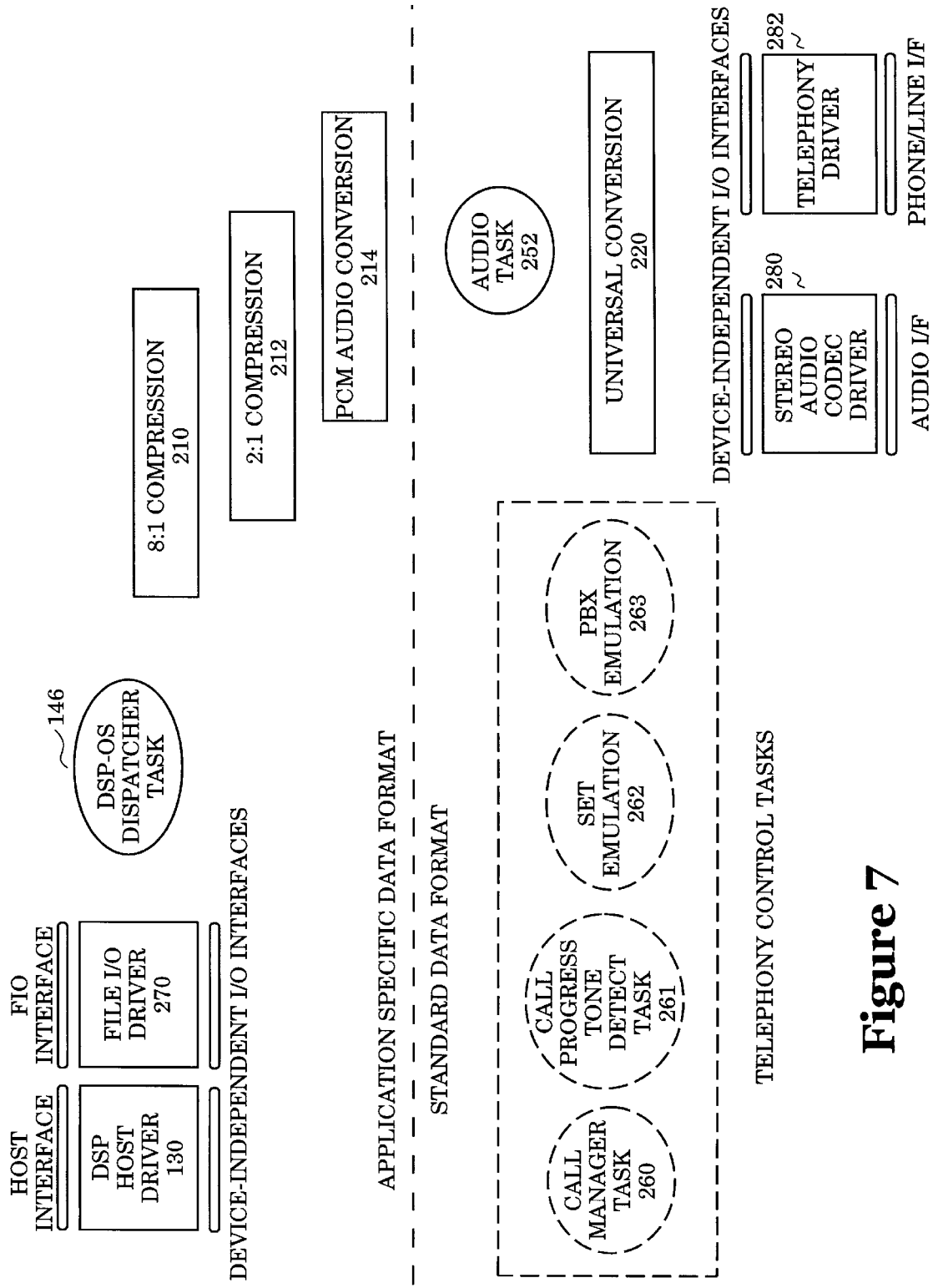
FIG. 7 illustrates the software architecture of the multifunction I/O subsystem for one embodiment.

FIG. 7 illustrates the software architecture of the multifunction I/O subsystem 14 for one embodiment. A DSP-OS dispatcher task 146 processes requests from the host phone control driver 160, the host audio driver 164 and the host fax-modem driver 166 to create and delete DSP-OS tasks.

The DSP-OS dispatcher task 146 matches the requested task name to the appropriate DSP-OS tasks and then loads and starts the new DSP-OS tasks. The DSP-OS dispatcher task 146 also creates mailboxes for communications between the host phone control driver 160 and the host fax-modem driver 166 and corresponding DSP-OS tasks. The DSP-OS dispatcher task 146 also creates mailboxes for communications between the host audio driver 164 and a corresponding DSP-OS task. The DSP-OS dispatcher task 146 also creates mailboxes for communications between the new DSP-OS tasks and other DSP-OS tasks.

A DSP file input/output (FIO) driver 270 enables access the host processor 32 file system by the DSP-OS tasks. The DSP-OS tasks use the DSP FIO driver 270 to perform open, read, write, and close operations, and to transfer data to and from files on the host processor 32 including files on the mass storage device 33.

The host phone control driver 160 and the host fax-modem driver 166 cause the DSP-OS dispatcher task 146 to create a set of telephony DSP-OS tasks 260–263 for normal processing of incoming calls over the telephone line 22. The digital set emulation DSP-OS task 262 is created if the serial telephone 15 is a digital telephone. The digital PBX emulation DSP-OS task 263 is created if the telephone line 22 is coupled to a digital PBX network.

The telephony DSP-OS tasks 260–263 perform analog and digital telephony functions through a DSP telephony driver 282. The DSP telephony driver 282 communicates through the phone interface circuit 66 to the analog phone line interface circuit 60 and the codec circuits 70 and 72.

The host audio driver 164 causes the DSP-OS dispatcher task 146 to create an audio DSP-OS task 252. The audio DSP-OS task 252 performs sound file record and playback functions through a DSP stereo audio codec driver 280 in a normal mode. The DSP stereo audio codec driver 280 communicates through the audio interface circuit 68 to the stereo audio codec circuit 54.

The audio DSP-OS task 252 also performs sound file record and playback functions through the DSP telephony driver 282 in a telephone audio I/O mode. A user interface function of the host audio application program 202 determines whether the audio DSP-OS task operates in the normal mode or the telephone audio I/O mode.

The audio DSP-OS task 252 functions as a server for the host audio driver 164. The audio DSP-OS task 252 performs the commands requested by the host audio driver 164 according to messages routed through the corresponding mailboxes.

During normal mode audio record operations, the DSP stereo audio codec driver 280 receives sound samples from the stereo audio codec circuit 54. The sound samples from the stereo audio codec circuit 54 comprise 16 bit integer data values. The DSP stereo audio codec driver 280 converts the sound samples into a sound data stream having the standard data format, and transfers the sound data stream to the audio DSP-OS task 252.

The audio DSP-OS task 252 preprocesses the sound data stream through either an 8:1 compression driver 210, a 2:1 compression driver 212, or a pulse code modulation (PCM) audio driver 214 according to the requirements of the host application program 202. The preprocessed sound data stream is then transferred to the host audio application program 202 through the device independent I/O interface of the DSP host driver 130, and up through the host audio driver 164.

The 8:1 compression driver 210 converts the sound data stream from the standard data format into an 8:1 compressed data format. The 2:1 compression driver 212 converts the sound data stream from the standard data format into an 2:1 compressed data format. The PCM audio driver 214 converts the sound data stream from the standard data format into a PCM format for Waveform files.

During normal mode audio playback operations, the host audio application program 202 transfers a sound data stream to the host audio driver 164 through the audio application program interface 171. The host audio driver 164 transfers the sound data stream to the host DSP driver 122 through the DSP interface 120. The audio DSP-OS task 252 receives the sound data stream from the host DSP driver 122 through either the 8:1 compression driver 210, the 2:1 compression driver 212, or the PCM audio driver 214 according to the requirements of the host application program 202.

The 8:1 compression driver 210 converts the sound data stream from the 8:1 compressed data format into the standard data format during audio playback. The 2:1 compression driver 212 converts the sound data stream from the 2:1 compressed data format into the standard data format during audio playback. The PCM audio driver 214 converts the sound data stream from the PCM format for Waveform files into the standard data format during playback.

The audio DSP-OS task 252 then transfers the standard format sound data stream to the DSP stereo audio codec driver 280 through the device independent I/O interface. The DSP stereo audio codec driver 280 converts the sound data stream into the 16 bit integer data values required by the stereo audio codec circuit 54 and then transfers the decompressed 16 bit sound data values to the stereo audio codec circuit 54 to generate sound playback.

During telephone audio I/O mode record operations, the DSP telephony driver 282 receives sound samples of the serial telephone 15 over the local line 20 from the analog phone line interface circuit 60 and the codecs 70 and 72. The DSP telephony driver 282 converts the sound samples into a sound data stream having the standard data format. The DSP telephony driver 282 then transfers the sound data stream to the audio DSP-OS task 252.

The audio DSP-OS task 252 preprocesses the sound data stream through either the 8:1 compression driver 210, the 2:1 compression driver 212, or the PCM audio driver 214 to convert the sound data stream from the standard data format to an application dependent format according to the requirements of the host application program 202. The preprocessed sound data stream is then transferred to the host audio application program 202 through the device independent I/O interface of the DSP host driver 130, and up through the host audio driver 164.

During telephone audio I/O mode playback operations, the host audio application program 202 transfers a sound data stream to the host audio driver 164 through the audio application program interface 171. The host audio driver 164 transfers the sound data stream to the host DSP driver 122 through the DSP interface 120. The audio DSP-OS task 252 receives the sound data stream from the host DSP driver 122 through either the 8:1 compression driver 210, the 2:1 compression driver 212, or the PCM audio driver 214 to convert the sound data stream into the standard data format.

The audio DSP-OS task 252 then transfers the sound data stream to the DSP telephony driver 282 through the device independent I/O interface. The DSP telephony driver 282 converts the standard data format sound data stream into sound data values required by the analog phone line interface circuit 60 and the codecs 70 and 72. The DSP telephony driver 282 then transfers the decompressed sound data values to the analog phone line interface circuit 60 and the codecs 70 and 72 to generate sound playback on the serial telephone 15 over the local line 20.

For one embodiment, the host audio application program 202 transfers sound data values from Waveform sound files to the audio DSP-OS task 252 during audio playback operations. The Waveform sound samples conform to the Waveform application program interface provided by Microsoft® Corporation for processing. The Waveform sound samples support sample rates of 8 Khz mono or stereo, 8 Khz mono or stereo, 11.025 Khz mono or stereo, 16 Khz mono or stereo, 22.05 Khz mono or stereo, 32 Khz mono or stereo, 44.1 Khz mono or stereo, and 48 Khz mono or stereo. Each sample comprises either 8 bits or 16 bits.

If the serial telephone 15 comprises a digital telephone, then sample rate conversion and stereo to mono conversion is performed for digital telephone compatibility. The audio DSP-OS task 252 performs sample rate conversion on the Waveform sound samples, and performs a stereo to mono conversion on the sound samples if necessary to conform the sound samples to the sample rate required by the serial telephone 15.

The standard format sound data streams are processed by a universal conversion driver 220 to perform the required sample-rate conversion and stereo-to-mono conversion. The universal conversion driver 220 converts a stream of standard format data from one sample rate to another using standard DSP up sampling, down sampling, and filtering techniques.

The universal conversion driver 220 converts stereo-to-mono by extracting interleaved samples from a standard data format sound data stream and summing together the interleaved samples to produce a non-interleaved data stream. The universal conversion driver 220 converts mono-to-stereo by duplicating samples from a standard data format sound data stream and interleaving the samples.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A computer system, comprising:
   a) multifunction input/output subsystem including:
      1) a telephone line interface circuit coupled to receive an incoming telephony signal from a telephone and coupled to transfer an outgoing telephony signal to the telephone;
      2) an audio circuit coupled to receive an incoming audio signal from a microphone and coupled to transfer an outgoing audio signal to a speaker; and
      3) a digital signal processor enabling multiple concurrent processing of the incoming and outgoing audio signals from said audio circuit and incoming and outgoing telephony signals from said telephone;
   b) a processor that executes:
      1) a telephony driver for the telephone line interface circuit and an audio driver for the audio circuit;
      2) an audio task to provide the sound data stream in the predefined data format to either the telephony driver or the audio driver during audio playback and receive the sound data stream in the predefined data format from either the telephony driver or the audio driver during audio recording
   wherein the multifunction input/output subsystem and processor enable said telephone to receive an incoming call while the telephone is employed as one of an input device for recording the sound data stream and as an output device for playback of said sound data stream.

2. The computer system defined by claim 1 wherein the telephony driver and the audio driver operate to generate and consume a sound data stream having a predefined data format within the computer system.

3. The computer system of claim 1, wherein execution of the telephony driver by the processor generates a set of sound samples by sampling audio signals over a local line coupled to the telephone, and converts the sound samples into the sound data stream having the predefined data format and then transferring the sound data stream to the audio task.

4. The computer system of claim 3, wherein execution of the audio task by the processor converts the sound data stream into a format required by a host audio application program executing in the computer system and then transfers the converted sound data stream to the host audio application program.

5. The computer system of claim 4, wherein execution of the audio task by the processor performs a data compression function on the sound data stream.

6. The computer system of claim 4, wherein execution of the audio task by the processor converts the sound data stream into a pulse code modulation data format.

7. The computer system of claim 4, wherein the telephone is a digital telephone.

8. The computer system of claim 7, wherein execution of the audio task by the processor converts the sound data stream into the format required by the host audio application program by performing a sample rate conversion on the sound data stream from a data rate corresponding to the digital telephone to a predefined sample rate supported by the host audio application program.

9. The computer system of claim 4, wherein execution of the audio task by the processor receives the sound data stream from a host audio application program and converts the sound data stream from the data format required by the host audio application program into the predefined data format and then transferring the sound data stream having the predefined data format to the telephony driver.

10. The computer system of claim 9, wherein execution of the telephony driver by the processor converts the sound data stream into a set of telephony data values and transfers the telephony data values to the telephone line interface circuit.

11. The computer system of claim 9, wherein execution of the audio task by the processor performs a data decompression on the sound data stream.

12. The computer system of claim 9, wherein execution of the audio task by the processor converts the sound data stream from a pulse code modulation data format into the predefined data format.

13. The computer system of claim 9, wherein the telephone is a digital telephone.

14. The computer system of claim 13, wherein execution of the audio task by the processor performs a sample rate conversion on the sound data stream from a predefined sample rate supported by the host audio application program to a data rate of the digital telephone.

15. A method for audio recording in a computer system, comprising the steps of;
   a) generating a set of sound samples by sampling audio information over a local telephone line coupled to a telephone, and converting the sound samples into a sound data stream having a predefined data format;
   b) transferring the sound data stream in the predefined data format to an audio task executing in the computer system, such that execution of the audio task converts the sound data stream in the predefined data format into a format required by a host audio application program executing in the computer system and then transfers the converted sound data stream to the host audio application program; and
   c) enabling concurrent processing of incoming audio signals from a local line and incoming telephony signals from the local telephone line by employing multifunction input/output subsystem connecting to the local line and the local telephone line.

16. The method of claim 15, wherein the step of converting the sound data stream into a format required by a host audio application program includes the step of performing a data compression function on the sound data stream.

17. The method of claim 15, wherein the step of converting the sound data stream into a format required by a host audio application program includes the step of converting the sound data stream into a pulse code modulation data format.

18. The method of claim 15, wherein the telephone is a digital telephone.

19. The method of claim 18, wherein execution of the audio task converts the sound data stream into the format required by the host audio application program by performing a sample rate conversion on the sound data stream from a data rate corresponding to the digital telephone to a predefined sample rate supported by the host audio application program.

20. A method for audio playback in a computer system, comprising the steps of:
- a) receiving a sound data stream from a host audio application program executing in the computer system, and converting the sound data stream from a data format required by the host audio application program into a predefined data format;
- b) transferring the sound data stream having the predefined data format to a telephony driver executing in the computer system, such that execution of the telephony driver converts the sound data stream in the predetermined data format into a set of telephony data values and transfers the telephony data values to a telephony circuit that generates telephony audio signals over a local telephone line; and
- c) enabling concurrent processing of outgoing audio signals to a local line and incoming telephony signals from the local telephone line by employing multifunction input/output subsystem connecting to the local line and the local telephone line.

21. The method of claim 20, wherein the step of converting the sound data stream from a data format required by the host audio application program into a predefined data format includes the steps of performing a data decompression on the sound data stream.

22. The method of claim 20, wherein the step of converting the sound data stream from a data format required by the host audio application program into a predefined data format includes the step of converting the sound data stream from a pulse code modulation data format into the predefined data format.

23. The method of claim 20, wherein the telephone is a digital telephone.

24. The method of claim 23, wherein the step of transferring the sound data stream having the predefined data format to a telephony driver further comprises the step of performing a sample rate conversion on the sound data stream from a predefined sample rate supported by the host audio application program to a data rate of the digital telephone.

25. The computer system of claim 1, wherein said computer system selectively enables said telephone to be employed as one of an input/output device and a telephone.

26. The method of claim 15 wherein the step of enabling concurrent processing of incoming audio signals from the local line and incoming telephony signals from the local telephone line further includes the step of:

allowing the telephone to receive an incoming call while executing steps a) and b).

27. The method of claim 20 wherein the step of enabling concurrent processing of outgoing audio signals to the local line and incoming telephony signals from the local telephone line further includes the step of:

allowing the telephone to receive an incoming call while executing steps a) and b).

* * * * *